US007479617B2

(12) United States Patent
Scott et al.

(10) Patent No.: US 7,479,617 B2

(45) Date of Patent: Jan. 20, 2009

(54) MONITORING SLOT FORMATION IN SUBSTRATES

(75) Inventors: Graeme Scott, Maynooth (IE); Seamus O'Brien, Castleblayney (IE); Iain Campbell-Brown, Naas (IE)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/880,728

(22) Filed: Jul. 24, 2007

(65) Prior Publication Data

US 2007/0263231 A1 Nov. 15, 2007

Related U.S. Application Data

(62) Division of application No. 11/180,369, filed on Jul. 13, 2005, now Pat. No. 7,268,315.

(51) Int. Cl.
*B23K 26/04* (2006.01)

(52) U.S. Cl. ............................ 219/121.67; 219/121.62; 219/121.71; 219/121.72; 219/121.83

(58) Field of Classification Search ................. 356/213, 356/625, 432; 219/121.6, 121.61, 121.62, 219/121.64, 121.67, 121.72, 121.76, 121.77, 219/121.82, 121.83
See application file for complete search history.

(56) References Cited

U.S. PATENT DOCUMENTS 4,242,152 A * 12/1980 Stone .................... 219/121.61
4,455,561 A * 6/1984 Boyden et al. ................ 347/52
5,272,312 A * 12/1993 Jurca ...................... 219/121.83
5,319,183 A * 6/1994 Hosoya et al. ......... 219/121.68
5,589,090 A * 12/1996 Song ..................... 219/121.62
5,681,490 A * 10/1997 Chang ................... 219/121.64
5,694,214 A 12/1997 Watanabe et al.
5,698,120 A * 12/1997 Kurosawa et al. ...... 219/121.62
5,916,460 A * 6/1999 Imoto et al. ............ 219/121.67
6,101,339 A 8/2000 Miki et al.
6,236,446 B1 * 5/2001 Izumi et al. ................. 349/187
6,337,461 B1 * 1/2002 Yasuda et al. .......... 219/121.62
6,433,304 B2 8/2002 Okumura et al.
6,563,082 B2 * 5/2003 Terada et al. ........... 219/121.72
2001/0006168 A1 7/2001 Okumura et al.
2003/0062126 A1 4/2003 Scaggs
2003/0117449 A1 6/2003 Cahill et al.
2003/0129814 A1 7/2003 Mizukoshi

FOREIGN PATENT DOCUMENTS

DE 4 124 162 12/1992
DE 10 256 262 6/2004
FR 2 112 586 6/1972

* cited by examiner

*Primary Examiner*—Sang Nguyen

(57) ABSTRACT

A light beam is used to cut a slot in a first side of substrate. An optical sensor monitors a surface of a second side of the substrate that is opposite the first side while cutting the slot. If the light beam breaks through the surface of the second side, the sensor detects the light beam.

6 Claims, 5 Drawing Sheets

MONITORING SLOT FORMATION IN SUBSTRATES

RELATED APPLICATION

This is a divisional application of U.S. patent application Ser. No. 11/180,369, filed Jul. 13, 2005 now U.S. Pat. No. 7,268,315, titled "MONITORING SLOT FORMATION IN SUBSTRATES," which application is assigned to the assignee of the present invention and the entire contents of which are incorporated herein by reference.

BACKGROUND

Fluid-ejection devices, such as ink-jet print heads, usually include a die, e.g., formed on a wafer of silicon or the like using semi-conductor processing methods, such as photolithography or the like. A die normally includes resistors or piezoelectric elements for ejecting fluid, e.g., marking fluids, medicines, drugs, fuels, adhesives, etc., from the die, and a fluid-feed slot (or channel) that delivers the fluid to the resistors or piezoelectric elements so that the fluid covers the resistors or piezoelectric elements. Electrical signals are sent to the resistors or piezoelectric elements for energizing them. An energized resistor rapidly heats the fluid that covers it, causing the fluid to vaporize and be ejected through an orifice aligned with the resistor. An energized piezoelectric element expands to force the fluid that covers it through the orifice.

Traditionally, the fluid feed slot has been formed with an abrasive sand blast process. To facilitate the development of smaller parts, the fluid-feed slot in the wafer is now formed using an electromagnetic beam, such as a light or laser beam, which allows much greater dimensional control. Until recently, the fluid-feed slot was formed in the wafer using a laser beam, with a hydrofluorcarbon (HFC) assist gas. However, hydrofluorcarbon (HFC) assist gases are being phased out due to environmental concerns. For some fluid-feed slot formation processes, a water-assist process has replaced HFC assist processes. Some processes involve covering components formed on the wafer prior to forming the slot to protect them during the formation of the slot. However, such coatings are typically water-soluble and cause problems for the water-assist process.

DETAILED DESCRIPTION

In the following detailed description of the present embodiments, reference is made to the accompanying drawings that form a part hereof, and in which are shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
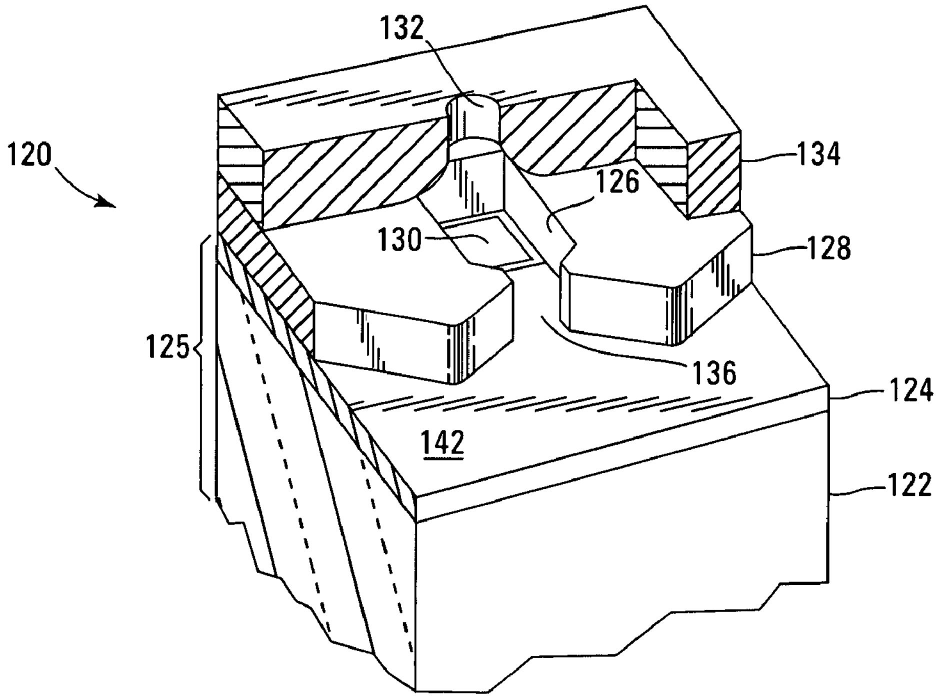
FIG. 1 is a perspective cutaway view of a portion of an embodiment of a fluid-ejection device, according to an embodiment of the disclosure.

FIG. 1 is a perspective cutaway view of a portion of a fluid-ejection device 120, such as a print head, showing components for ejecting a fluid, according to an embodiment. For one embodiment, fluid-ejection device 120 may be used as a print head, a fuel injector, an IV dispenser, and an inhalation device, such as a nebulizer, as well as to deposit drugs on a substrate, deposit color filters onto display media, deposit adhesives onto substrates, etc.

The components of fluid-ejection device 120 are formed on a wafer 122, e.g., of silicon, that may include a dielectric layer 124, such as a silicon dioxide layer. Hereafter, the term substrate 125 will be considered as including at least a portion of wafer 122 and at least a portion of dielectric layer 124. A number of print head substrates may be formed simultaneously on a single wafer die, each having an individual fluid-ejection device.

Liquid droplets are ejected from chambers 126, e.g., often called firing chambers, formed in the substrate 125, and more specifically, formed in a barrier layer 128 that for one embodiment may be from photosensitive material that is laminated onto substrate 125 and then exposed, developed, and cured in a configuration that defines chambers 126.

The primary mechanism for ejecting a liquid droplet from a chamber 126 is an ejection element 130, such as a piezoelectric patch or a thin-film resistor. The ejection element 130 is formed on substrate 125. For one embodiment, ejection element 130 is covered with suitable passivation and other layers, as is known in art, and connected to conductive layers that transmit current pulses, e.g., for heating the resistors or causing the piezoelectric patches to expand.

The liquid droplets are ejected through orifices 132 (one of which is shown cut away in FIG. 1) formed in an orifice plate 134 that covers most of fluid-ejection device 120. The orifice plate 134 may be made from a laser-ablated polyimide material. The orifice plate 134 is bonded to the barrier layer 128 and aligned so that each chamber 126 is continuous with one of the orifices 132 from which the liquid droplets are ejected.

Figure 2:
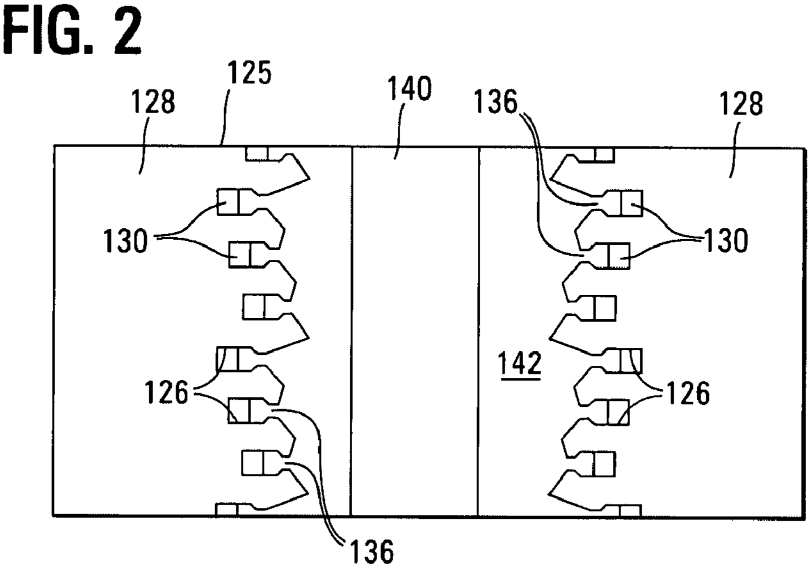
FIG. 2 is a top plan view of an embodiment of the fluid-ejection device, according to an embodiment of the disclosure.

Chambers 126 are refilled with liquid after each droplet is ejected. In this regard, each chamber is continuous with a channel 136 that is formed in the barrier layer 128. The channels 136 extend toward an elongated feed channel (or slot) 140 (FIG. 2) that is formed through substrate 125. Feed channel 140 may be centered between rows of firing chambers 126 that are located on opposite long sides of the feed channel 140, as shown in FIG. 2, according to another embodiment. For one embodiment, the feed channel 140 is made after the fluid-ejecting components (except for the orifice plate 134) are formed on substrate 125.

The just mentioned components (barrier layer 128, resistors 130, etc.) for ejecting the liquid drops are mounted to a top (or upper surface) 142 of the substrate 125. For one embodiment, the bottom of the fluid-ejection device 120 may be mounted to a fluid reservoir portion, e.g., of an ink cartridge, or feed channel 140 may be coupled to a separate reservoir, such as an off-axis ink reservoir, e.g., by a conduit, at the bottom so that the feed channel 140 is in fluid communication with openings to the reservoir. Thus, refill liquid flows through the feed channel 140 from the bottom toward the top 142 of the substrate 125. The liquid then flows across the top 142 (that is, to and through the channels 136 and beneath the orifice plate 134) to fill the chambers 126.

Figure 3A:
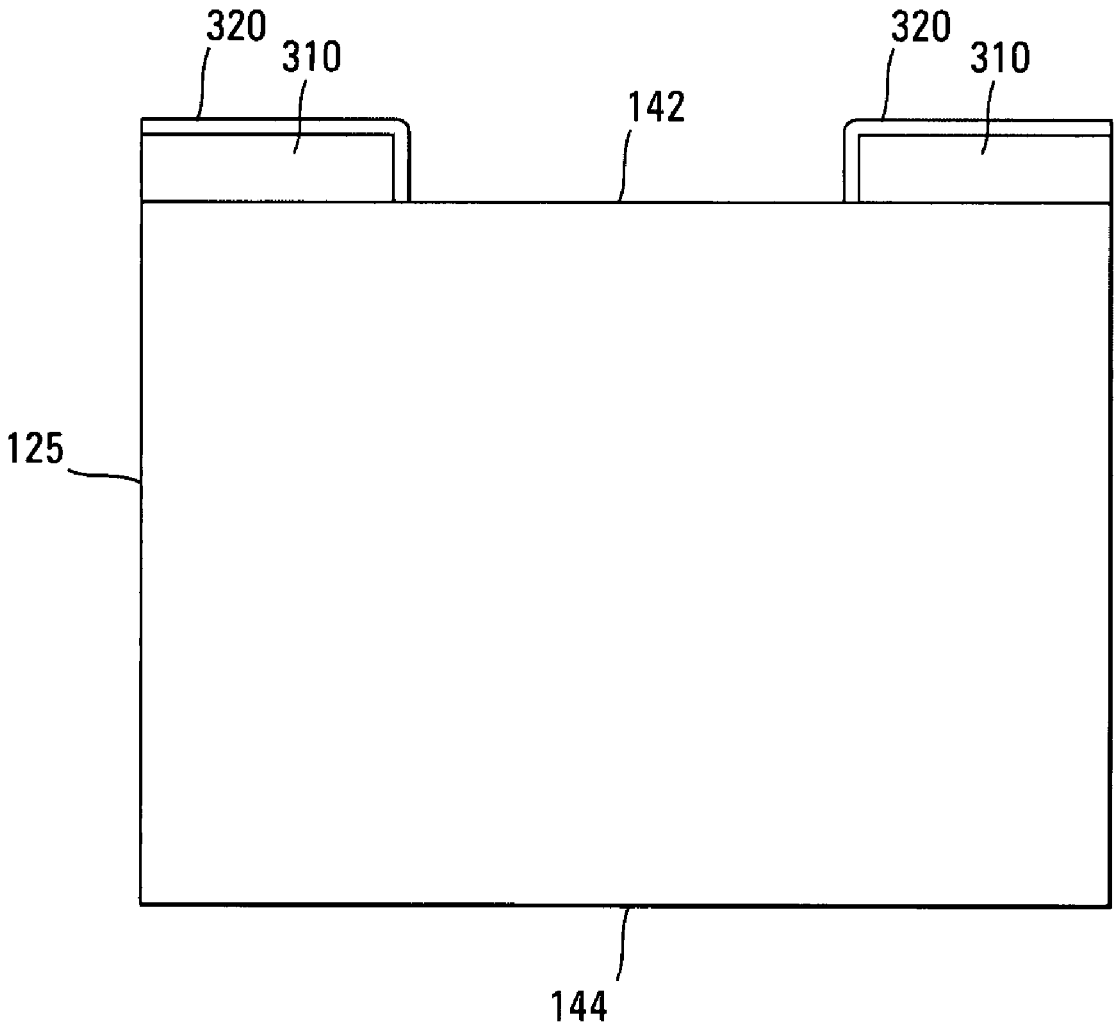
FIGS. 3A-3C are cross-sectional views of a portion of an embodiment of a fluid-ejection device during various stages of formation of a fluid feed channel, according to another embodiment of the disclosure.
Figure 3B:
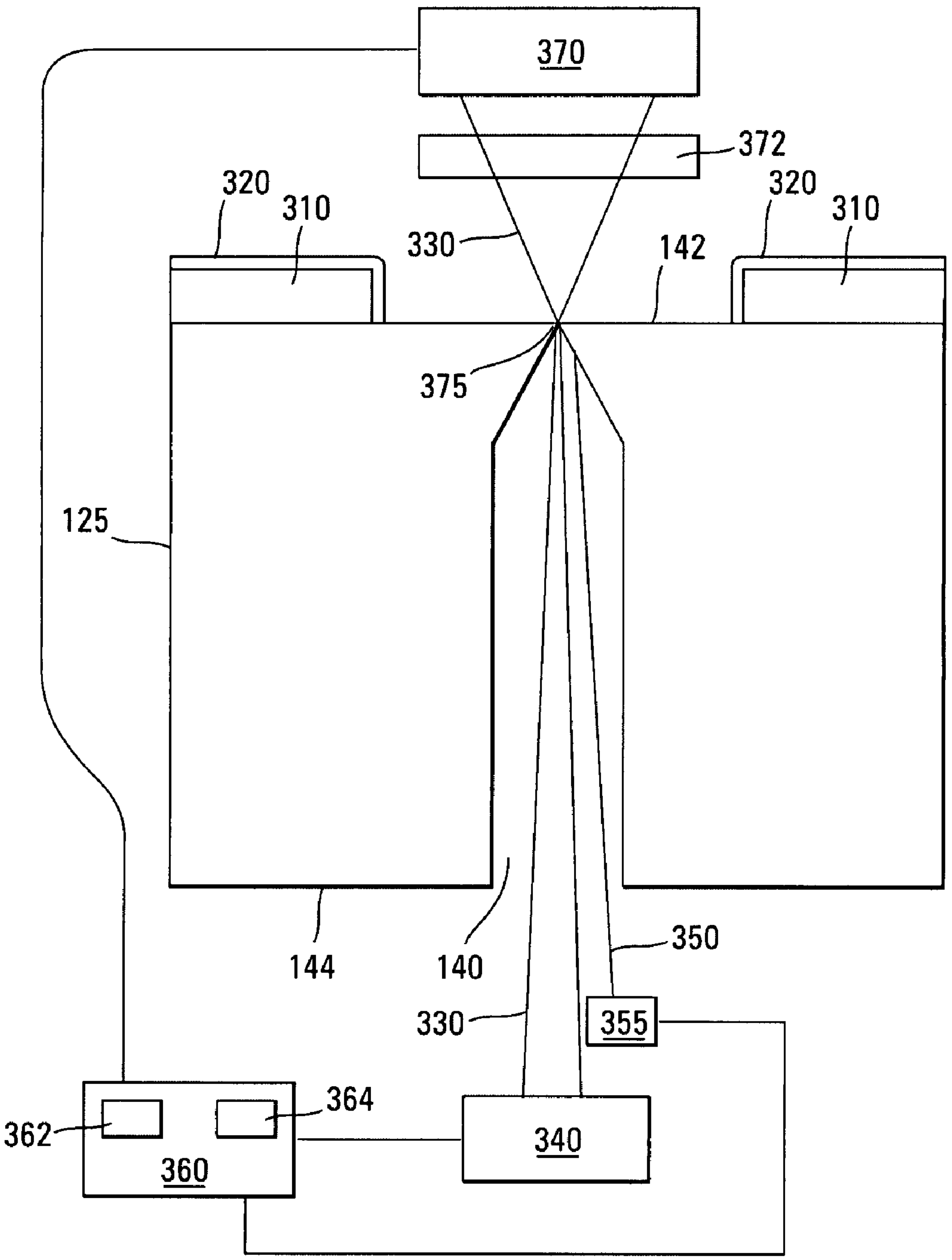
Figure 3C:
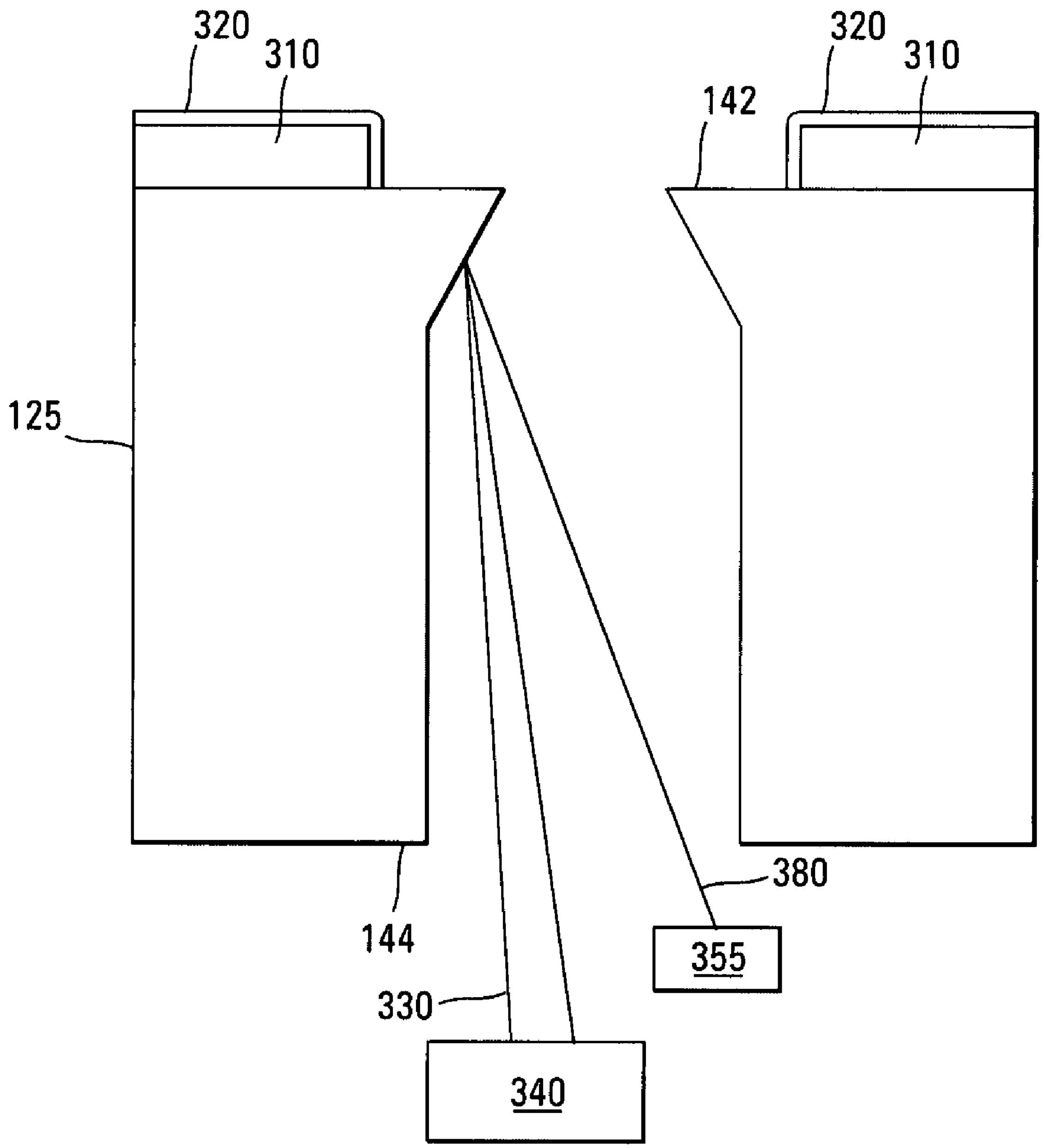

FIGS. 3A-3C are cross-sectional views of a portion of substrate 125 (FIGS. 1 and 2) during various stages of formation of feed channel 140, according to another embodiment. The above-described components, such as the barrier layer, ejection elements, etc., are shown for simplicity as a single layer 310. For one embodiment, a protective layer 320 that may be water-soluble (such as a spun and baked 'universal coating', based on Isopropanol, Polyvinyl alcohol and deionized water mixtures) may cover these components. At least a portion of feed channel 140 is formed in substrate 125 using a light beam 330, such as a laser beam, e.g., of ultraviolet light, emitted from a light source 340, starting at a bottom 144, in FIG. 3B. As used herein the term "light" refers to any applicable wavelength of electromagnetic energy. For one embodiment, a water-containing jet 350, e.g., a jet of misted (or aerosolized) water, is directed into feed channel 140, e.g., from an air/water source 355, as light beam 330 removes substrate material. For another embodiment, water-containing jet 350 acts to remove debris from feed channel 140. For another embodiment the light beam 330 is scanned over the surface of substrate 125 using a two mirror galvanometer scan head allowing complex 3D features, such as fluid feed slots, to be formed by removing material with light beam 330 in a preprogrammed spatial pattern (as described in WO03053627).

For one embodiment, a controller 360 is connected to light source 340 and air/water source 355. For another embodiment, controller 360 includes a processor 362 for processing computer/processor-readable instructions. These computer-readable instructions, for performing the methods described herein, are stored on a computer-usable media 364, and may be in the form of software, firmware, or hardware. As a whole, these computer-readable instructions are often termed a device driver. In a hardware solution, the instructions are hard coded as part of a processor, e.g., an application-specific integrated circuit (ASIC) chip. In a software or firmware solution, the instructions are stored for retrieval by the processor 362. Some additional examples of computer-usable media include static or dynamic random access memory (SRAM or DRAM), read-only memory (ROM), electrically-erasable programmable ROM (EEPROM or flash memory), magnetic media and optical media, whether permanent or removable. Most consumer-oriented computer applications are software solutions provided to the user on some removable computer-usable media, such as a compact disc read-only memory (CD-ROM).

For one embodiment, controller 360 is connected to an optical sensor 370, such as a photo diode having a nanosecond or faster response time at the wavelength emitted by light source 340, such as silicon PIN detector model number ET-2030 for wavelengths between 300 and 1100 nm that is available from Electro-Optics Technology, Inc. (Traverse City, Mich., USA) for sensing whether light beam 330 penetrates upper surface 142 forming a "pinhole" 375 in upper surface 142. If light beam 330 penetrates upper surface 142 and pinhole 375 is sufficiently large, water from water-containing jet 350 can pass through pinhole 375 and reach protective layer 320, causing protective layer 320 to dissolve, leaving layer 310 unprotected. Portions of the dissolved protective layer 320 may also mix with substrate debris resulting in reduced solubility of the protective layer. Following cleaning, residual debris restricts or completely blocks the various channels 136 (FIGS. 1 and 2). Note that if pinhole 375 is small enough, surface tension and/or viscous effects of the water may act to prevent the water from passing through pinhole 375.

At substantially the same time as pinhole 375 is formed, a portion of light beam 330 passes through pinhole 375, passes through an optional filter 372, e.g., an ultra-violet filter, and is sensed by optical sensor 370. For one embodiment, optional filter 372 may be selected to limit the amount of laser light reaching the optical sensor 370 to reduce the likelihood of signal saturation or damage to sensor 370. For another embodiment, may be chosen to selectively block any extraneous light generated by the laser removal process (e.g., a narrow band-pass filter centered on the wavelength of light source 340), such as laser generated plasma emissions. Optical sensor 370 converts the sensed light beam into a signal indicative of the light beam and transmits the signal to controller 360. For one embodiment, controller 360 keeps track of the number of pinholes, and compares the number to a predetermined (or acceptable) number of pinholes. If the number of pinholes exceeds the predetermined number, an indication of too many pinholes is given, e.g., in the form of an audible and/or visual alarm, and/or light source 340 and water-containing jet 350 are stopped.

Figure 4:
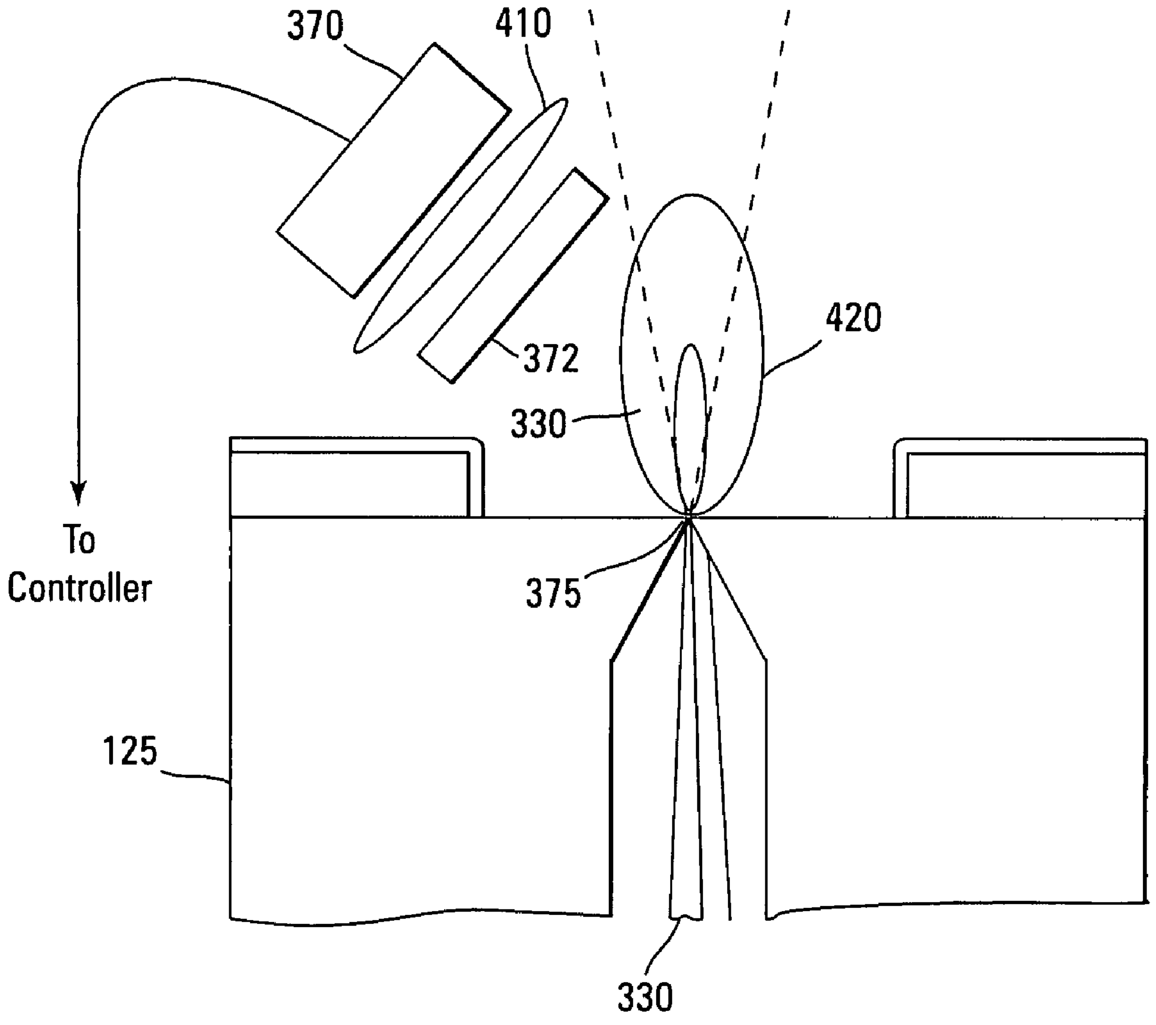
FIG. 4 illustrates an embodiment for monitoring slot formation in a substrate, according to another embodiment of the disclosure.

In some embodiments, optical sensor 370 is mounted off a central axis of light beam 330, e.g., off a central axis of a likely location of a pinhole 375, so that it senses the pinhole 375 at an angle relative to light beam 330, as shown in FIG. 4. Note that for one embodiment, a lens 410 may be interposed between optical sensor 370 and filter 372. For this configuration, optical sensor 370 senses scattered light and/or plasma light generated by light beam 330 to enable detection of pinholes 375. More specifically, light beam 330 heats a portion of substrate 125, causing some of the heated portion to vaporize. The vaporized substrate material is heated further by light beam 330 that generates a plasma 420 that radiates broadband radiation. When light beam 330 just breaks through, the pressure of the vapor and plasma is sufficient for it to blow out of a pinhole 375, causing light beam 330 and plasma 420 to issue from pinhole 375 that can be detected by the off-axis configuration of optical sensor 370. The plasma and any silicon debris may also scatter the laser light that can be detected by the off-axis configuration of optical sensor 370.

For another embodiment, the amount of light, and thus a size of the pinhole, is related to an amplitude, e.g., voltage, of the signal. For some embodiments, the amplitude is compared to a predetermined (or an acceptable) amplitude corresponding to an acceptable pinhole size. If the amplitude exceeds the predetermined amplitude, an indication that the pinhole is too large is given, e.g., in the form of an audible and/or visual alarm, and/or light source 340 and water-containing jet 350 are stopped. For some embodiments, the predetermined number of pinholes depends on the size of the pinholes. For these embodiments, a collective size of the pinholes is determined by summing the size of each pinhole over the number of pinholes. The collective size may then be compared to a predetermined collective pinhole size. If the collective size exceeds the predetermined collective size, an indication of this is given, e.g., in the form of an audible and/or visual alarm, and/or light source 340 and water-containing jet 350 are stopped. For one embodiment, forming feed channel 140 with light beam 330 and water-containing jet 350 proceeds until a pinhole is sensed, thereby establishing a depth limit for feed channel 140 for which the water-containing jet 350 can be used.

In a further embodiment, optical sensor 370 may include a camera, e.g., an analog or digital camera, with a video card and a processor for converting and monitoring the output of individual video lines of the analog camera or individual pixels of the digital camera. For one embodiment, controller 360 may process signals from the camera. For another embodiment, a field of view of the camera can be adjusted by a correct choice of camera lens so that only the area being scanned directly with light beam 330 is monitored, thereby increasing the sensitivity.

After feed channel 140 reaches a predetermined depth, such as when a pinhole is sensed, water-containing jet 350 is turned off, any remaining water is removed from feed channel 140, and, as shown in FIG. 3C, an air jet 380 is directed into feed channel 140, e.g., from air/water source 355. Air jet 380 is then used in conjunction with light beam 330 to finish feed channel 140, i.e., so that feed channel 140 passes through upper surface 142 at a desired size, as shown in FIG. 3C for an embodiment. After finishing feed channel 140, protective layer 320 is removed, e.g., using commercial wafer cleaning equipment, such as ONTRAK model DSS-200 Post CMP Wafer Scrubber System available from Axus Technology, Chandler, Ariz., USA.

CONCLUSION

Although specific embodiments have been illustrated and described herein it is manifestly intended that the scope of the claimed subject matter be limited only by the following claims and equivalents thereof.

What is claimed is:

1. A method of forming a fluid-ejection device, comprising:

forming a first portion of a feed channel in a substrate, starting at a first side of the substrate, using a light beam in conjunction with a water-containing jet;

monitoring a surface of a second side of the substrate that is opposite the first side, using an optical sensor, while forming the first portion of the feed channel;

detecting the light beam, using the sensor, if the light beam breaks through the surface of the second side; and forming a second portion of the feed channel using the light beam in conjunction with an air jet after the first portion reached a predetermined depth.

2. The method of claim 1, wherein the predetermined depth corresponds to a depth of the first portion when the light beam breaks through the surface of the second side.

3. The method of claim 1 further comprises, if the light beam breaks through the surface of the second side, determining a size of a hole in the surface of the second side formed by the light beam breaking through the second side using a signal from the sensor.

4. The method of claim 1 further comprise, if the light beam breaks through the surface of the second side, comparing an output of the sensor indicative of a size of a hole in the surface of the second side formed by the light beam breaking through the second side to a predetermined size.

5. The method of claim 1 further comprises forming a fluid ejection components on the second side of the substrate before forming the channel.

6. The method of claim 5 further comprises forming a protective layer overlying the fluid ejection components before forming the channel.

* * * * *